Figure 1:
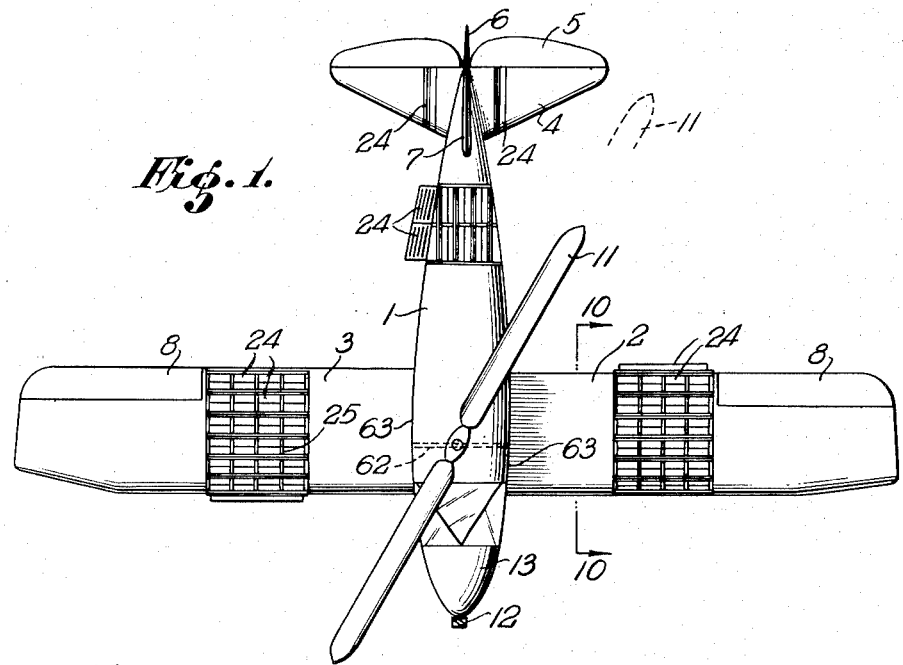

Nov. 20, 1951 — G. F. MYERS — 2,575,886
HELICOPTER ANTITORQUE MECHANISM
Filed Feb. 27, 1943 — 4 Sheets-Sheet 1

Inventor:
George Francis Myers

Nov. 20, 1951  G. F. MYERS  2,575,886
HELICOPTER ANTITORQUE MECHANISM
Filed Feb. 27, 1943  4 Sheets-Sheet 2

Inventor:
George Francis Myers

Nov. 20, 1951     G. F. MYERS     2,575,886
HELICOPTER ANTITORQUE MECHANISM
Filed Feb. 27, 1943     4 Sheets-Sheet 4
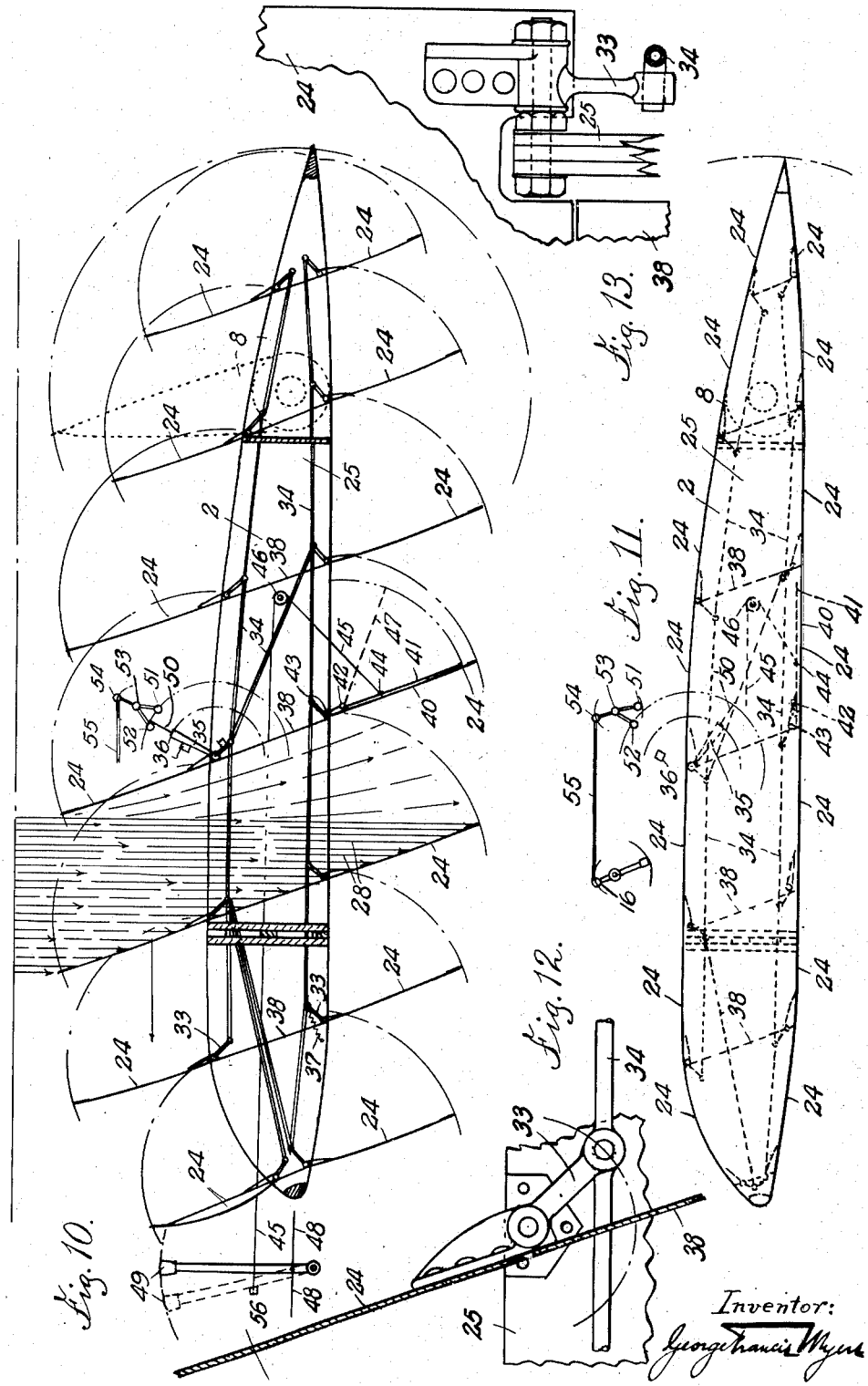
Inventor:
George Francis Myers

Patented Nov. 20, 1951

2,575,886

UNITED STATES PATENT OFFICE 2,575,886

HELICOPTER ANTITORQUE MECHANISM

George Francis Myers, New York, N. Y.

Application February 27, 1943, Serial No. 477,359

6 Claims. (Cl. 244—6)

This invention relates to flying machines, and particularly to that class thereof known as rotary wing machines.

It has for its object to produce an aircraft that will lift up vertically from any place, land vertically anywhere, and hover, and yet will fly fast horizontally.

Another object is to produce a machine that has all of the good characteristics and performance of a helicopter, and all of the good characteristics and performance of an airplane.

Among other objects are: eliminating or counteracting the inevitable torque reaction on the fuselage by mounting valves or vanes in the wings directly in the slipstream of the rotor; also mounting vanes or valves in the fuselage, and sometimes adjacent to the engine; placing the valves at an angle to the vertical, say fifteen degrees, so that the horizontal component of the thrust due to the slipstream from the rotor will force that side of the wing in a direction counter to the direction given the wing by the torque; mounting the valves on one side of the wing with the fifteen degrees facing one way, and the valves on the other side of the wing facing oppositely; making the valves of very thin material, say metal or plastic, and laying the same on the top and bottom of the ribs of the wing, so that the conformation or profile of the wing is not in any way altered or deformed when the valves are closed top and bottom and the machine is flying horizontally; having the valves or vanes mounted both on the top and the bottom of the wing and in line one with the other, and also in line with a stationary vane on the inside of the wing between the top and bottom thereof making one long continuing vane; using the flat sides of the ailerons as vanes when standing up at the fifteen degree position; mounting valves on the stabilizing plane or on the elevator when the tips of the rotor reach out that far; connecting the vanes with the clutch that binds the engine to the vertical shaft of the rotor in such a manner that the vanes will open just before the full blast of the slipstream reaches them and so that the blast will be off before the valve closes, in order that the mechanism of the valves can be operated easily and quickly.

Among still other objects are: balancing or stabilizing the machine by means of pockets of air formed in the wing or fuselage between the ribs and the same valves used as torque compensators; catching the blast made by the slipstream from the rotor and building up a pressure in the pocket that forces down that side or end more or less as the valves forming the lower side of the wing are closed more or less; using vanes superimposed over the torque compensating vanes in the wings and fuselage for balancing.

The invention also consists of certain other objects and features of construction, and in the combination and arrangement of the several parts to be more fully hereinafter described, illustrated in the appended drawings, and then specifically pointed out in the claims.

Figure 2:
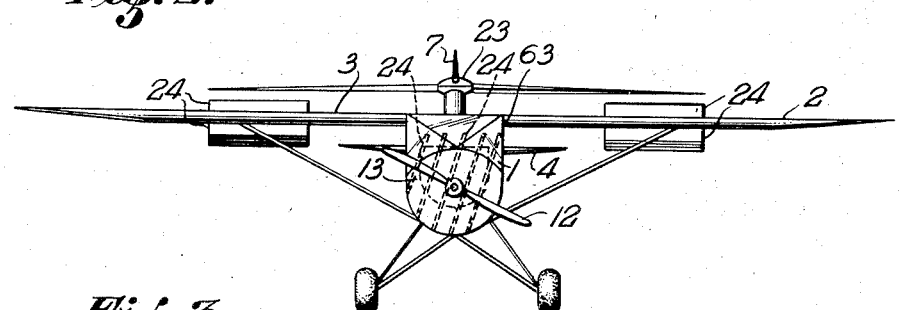
Figure 3:
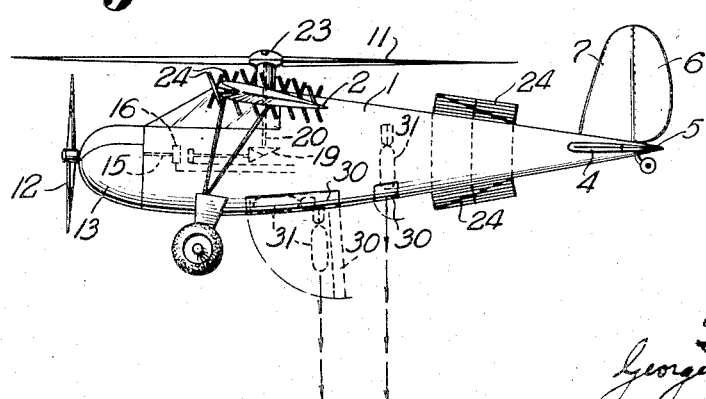

In the accompanying drawings where similar numerals of reference indicate the same feature throughout the several views:

Figure 1 is a plan view of the invention attached to a high wing monoplane, as it appears when the machine is rising vertically. The rotor or top propeller is in action sending its blast of slipstream down on the vanes or valves which are in their open position standing at about fifteen degrees to the vertical so that the horizontal component of the downwash from the rotor pushes the machine around in a direction contrary to that of the torque; the front or airplane propeller is inactive. Fig. 2 is a front elevation of Fig. 1; and Fig. 3 is a side elevation thereof.

Figure 4:
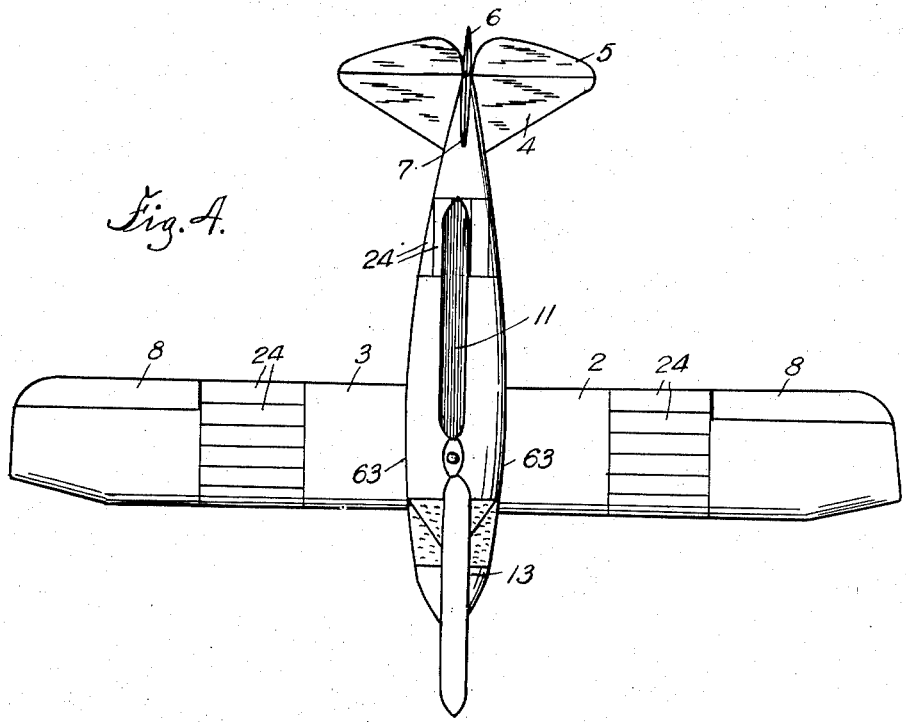
Figure 5:
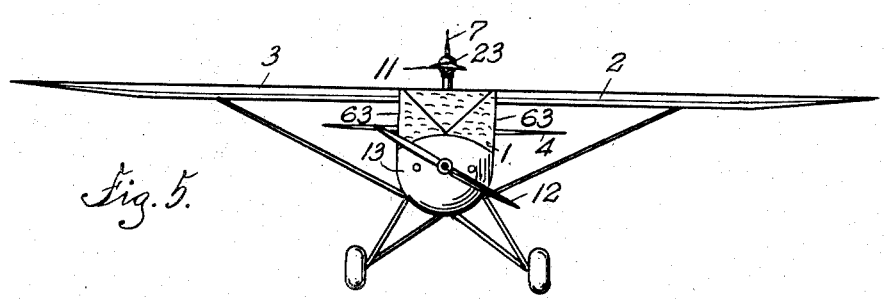
Figure 6:
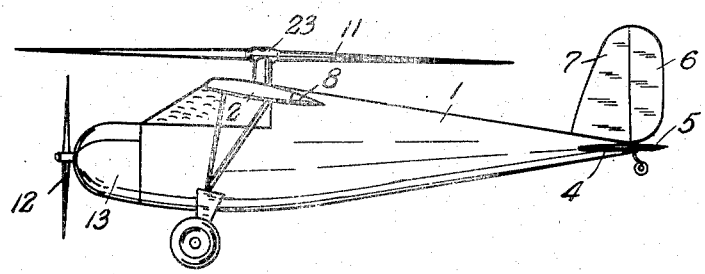

Fig. 4 is a plan view of the invention as it appears when flying horizontally with the rotor inactive, but with the front or airplane propeller operating. Figs. 5 and 6 are respectively the front and side elevations of Fig. 4.

Figure 7:
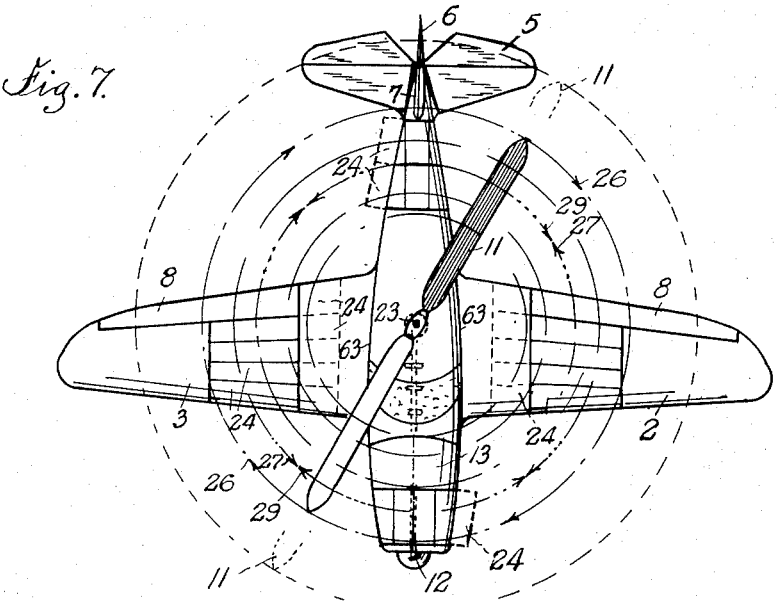
Figure 8:
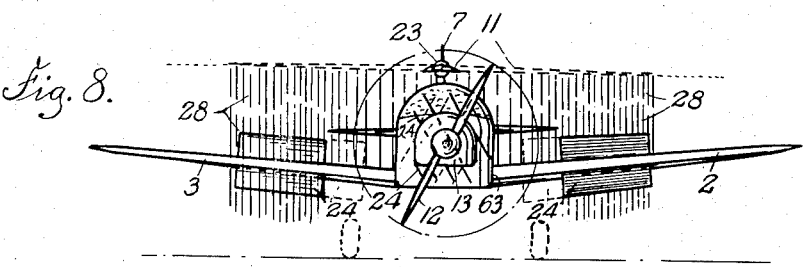
Figure 9:
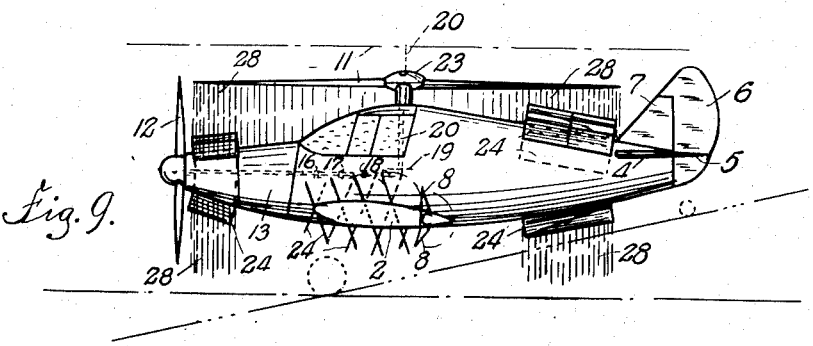

Fig. 7 is a plan view of a modification of the invention attached to a low wing monoplane flying vertically with the vanes mounted at or adjacent to the nose of the fuselage as well as at or adjacent to the tail thereof and on each side of the wing. Also is shown, in dotted lines, the tips of a rotor having a greater diameter, so that the periphery thereof covers all of the controls of the machine both airplane and helicopter; and the periphery of the airplane propeller covers all of the controls in a horizontal direction, both airplane and helicopter. Figs. 8 and 9 are respectively the front and side elevations of Fig. 7. In Fig. 9 is shown a rotor mounted between the front propeller and the tail unit, bringing the rotor close to the top of the fuselage and giving less drag by the rotor when the machine is travelling horizontally and the rotor is not operating, but is lying inert in the position outlined in Fig. 4, for instance.

Fig. 10 is a section taken along the line 10—10 of the wing in Fig. 1 showing all of the vanes or valves in action, both top and bottom, with the intermediate plane or vane between the top and bottom surfaces of the wing making with the other two valves a long continuous vane. On one of the continuing vanes the slipstream is shown impinging or striking the same from top to bottom, the horizontal component of which tends to turn the wing in a direction contrary to that of the torque. On another one of said vanes is shown a balancing plane or vane or valve catching the air being blasted down by the slipstream on say one of the sides of the machine and pushing that side down in order to balance or stabilize the machine. This view also shows how the ailerons can be used as one of the torque compensating vanes, as brought out in Fig. 9. Fig. 11 is a side elevation or section as in Fig. 10 showing all of the vanes at rest and forming the top and bottom curves of the wing without any deformation. Figs. 12 and 13 are enlarged views of details of Fig. 10.

The invention is constructed and operated substantially and preferably as follows:

1 is the fuselage, 2, 3 the wings, 4 the stabilizer, 5 the elevator, 6 the rudder, 7 the fin, 8 the ailerons, 11 the top or helicopter propeller or rotor, 12 the front or airplane propeller or airscrew, 13 the engine or the cowling therefor, 15 the horizontal shaft, 16 the clutch, 17 the brake and overrunning clutch, 18 the ratchet, 19 the bevel gearing, 20 the upright shaft, 23 the streamliner.

In both wings 2 and 3 and in the fuselage 1 are the vanes or valves 24 lying on the ribs 25. If the rotor be rotating clockwise as in Fig. 7 at 26 the fuselage will of course tend to turn in the opposite direction 27 on account of the torque. Therefore the vanes are placed with their upper edges pointing rearwardly in the right hand wing, and pointing forwardly in the left hand wing 2, Fig. 1, also see Fig. 10. The horizontal component of the downward thrust or downwash of the slipstream 28 from the rotor will turn the machine in the contrary direction as 29, and thus the torque will be counteracted; the vanes on the fuselage will help in this counteraction.

33 is the link attached to each of the vanes and to the rod 34 which when operated opens and closes the vanes; the rod 34 is operated by the lever 35 handy to the cabin. Springs 37 draw one or more of the vanes back into place when not in use. 36 is a stop for the lever 35. The vanes 24 are continued through the inside of the wing by the extra vane 38, the three vanes: top vane 24, bottom vane 24, and extra or middle vane 38 make one continuous vane as shown in Fig. 10. The ailerons when lifted up to their extraordinary positions, as shown in Figs. 9 and 10 may be used as vanes.

40 is a special lower vane used for balancing the machine, while the other vanes are for counteracting the torque. The vane, or vanes, 40 has an overlapping vane 41 hinged at 42 while 40 is hinged at 43. At 44 a cord 45 is fastened to 41 and runs over a pulley 46 to the joystick or control wheel 49 in the cabin. When 40 is brought up to say the position shown in dotted lines 47 it will imprison air in a pocket formed by 40 and 38 fore and aft, and the two ribs 25, therefore the slipstream 28 will push down the side on which the said pocket is located and thus balance or stabilize the machine, when the machine is travelling vertically or is hovering; the blast of the slipstream will force the said auxiliary vane 41 down, when the control column is moved back again to its original position. When the vane 40 is drawn up to the ribs it will carry the auxiliary vane 41 with it; and all of the vanes will be closed, and the original conformation of the wing or fuselage will not be altered.

The handle or lever 35 has an extension thereon as 50 which is mounted between two rollers 51 and 52 hinged at 53 and extending to 54 from whence a rod 55 extends to the clutch 16. Therefore the vanes are opened first before the blast of the slipstream covers them. And the blast of the slipstream is off before the vanes are closed.

The pilot when ready to take off from the ground, starts his engine and throws in the clutch 16 which will do two things: it will open the vanes wide both in the wings and in the fuselage first; and then will start the rotor rotating. He however leaves the front propeller or airscrew rotating at a zero angle of incidence; or if a clutch is provided he unclutches the front propeller.

If the machine should tip forward the pilot closes the rear row of vanes on the two wings, or the vanes on the fuselage, or even the vanes in the stabilizing plane. If the machine tipped backward in said Fig. 1, the pilot would close the vanes in the front row of the wing vanes— one row on each side. In Figs. 7-9 he could do this movement, or he could close the lower vanes on the front portion of the fuselage in front of the engine cowling 13.

As soon as the machine rises off the ground there will be torque which tends to turn the machine in a direction opposite to that of the rotor. But this has been taken care of by the vanes in the wings and fuselage. There is enough surface exposed, placed say at fifteen degrees to the vertical, to the blast of the slipstream, so that the horizontal component of the blast will pull the fuselage and wings around against the torque.

The machine now rises off the ground to a sufficient height so as to be able to fly over any obstacle in its immediate path. The pilot then closes the vanes tending to push down the front of the machine until the vertical axis thereof is at the angle desired, and the horizontal component of the thrust of the rotor will carry the machine forward at a slow speed; the opening and closing of the appropriate lower vanes in the wings and fuselage giving the necessary balance or stabilization.

When the stalling speed of the machine is reached, the pilot rights the machine by closing the rear vane or vanes, and the machine is now an ordinary airplane and the airplane controls now take complete control of the machine. At the same time the pilot changes the pitch of the airscrew to a positive angle, and also draws over the lever 35 which strikes the roller 51 and pushes the arm 54 and rod 55 and the clutch handle of the clutch 16 which throws the same and the rotor is free from the engine. This same action closes all the vanes and the conformation of the wings top and bottom is the correct profile.

The rotor is stopped in a position parallel to the line of flight as shown in Figs. 4, 5, 6, and will give very little drag.

If in landing vertically the pilot finds he has overflown his objective he can fly backward by inclining his vertical axis to the rear by the aid of the vanes; or he may move to the right or left by the same mechanism.

As my invention is in some of its aspects generic, I do not limit myself to the particular construction shown and described, but also contemplate the employment of such equivalents as fairly fall within the scope of the claims.

Therefore it should be understood that various changes may be made in the form, proportion, size and detail of the structures shown and described, the number and position of certain elements used, as well as the character of the motive power employed, without departing from the spirit of the invention.

I claim:

1. In a helicopter, a hollow body having apertures therethrough from top to bottom, a rotor giving torque and slipstream mounted above the body, an engine mounted on the body and connected to the rotor, a plurality of vanes pivoted on the top and on the bottom of the body directly under the slipstream, said vanes being movable between inactive and active positions, said vanes covering the apertures when in the inactive position and when active standing at an angle to the body and aligned in pairs slantingly; a plurality of additional vanes mounted inside the hollow body between the top and bottom thereof and in line with both the top and the bottom vanes making one continuous vane when the vanes are in their active positions, a rod or rods connected to all of the first mentioned vanes, and other rods connected to certain of the said vanes only.

2. The combination in a helicopter, of a fixed wing having a plurality of apertures therethrough, a rotary wing mounted above the fixed wing, power means for driving the rotary wing giving slipstsream and torque, said apertures being disposed in the path of rotary wing slipstream, a plurality of valves covering the apertures top and bottom, means for opening and closing the valves, and other means for operating certain of the bottom valves to balance the helicopter by forming confining places catching the slipstream.

3. A helicopter comprising a hollow body having apertures therein top and bottom, a rotor giving torque and slipstream mounted above the body, an engine also mounted on the body for driving the rotor, movable vanes mounted on the upper and lower portions of the hollow body adjacent said apertures, means for moving said vanes between a first position, wherein they close said apertures, and a second position, wherein they extend outwardly from said body, intermediate stationary vanes mounted between the top and bottom portions of the hollow body and in line with said movable vanes, said movable vanes when in said second position forming continuous co-planar extensions of said stationary vanes, and means for independently operating certain of said lower removable vanes; all so constructed, arranged and operated that the vanes are used both for counteracting the torque, and for balancing the helicopter when travelling vertically, when travelling horizontally slowly and when hovering.

4. An aircraft comprising a fuselage, a pair of fixed wings having top and bottom coverings and mounted on the fuselage one on each side thereof with apertures therein, a plurality of valves mounted in the wings over the apertures in the top and bottom coverings thereof with an open space between the coverings, a single helicopter propeller mounted above all of the valves on both sides of the fuselage and giving torque reaction on the fuselage and slipstream, means for operating the valves simultaneously to interact with the propeller slipstream for counteracting the torque, and a plurality of secondary valves independently operable for correcting the balance of the craft.

5. A helicopter comprising a fuselage, an engine mounted on the fuselage, a pair of fixed wings mounted one on each side of the fuselage, each of the wings having a plurality of apertures therein and valves thereover, a substantially vertical shaft connected to the engine, a single rotary wing assembly giving torque reaction on the fuselage and making slipstream and mounted on said shaft directly above all of the valves, a clutch binding the engine and the shaft, a lever attached to the clutch, and a rod connecting the lever and the valves; all so constructed and arranged that on moving said lever in one direction the valves will open just before the full blast of the slipstream reaches them, and on moving said lever in the opposite direction the blast will be off before the valves close, in order that the valves can be operated easily and quickly.

6. In a helicopter, a device adapted to function in response to the slipstream produced by the lift rotor of the helicopter, said device comprising a hollow body having a first set of openings formed in one of its walls and a second set of openings formed in another of its walls, said walls being in opposed substantially parallel relation and said openings being so located that each opening of one set is aligned with an opening of the other set, a vane pivotally mounted at one edge of each of said openings and swingable between a closed position wherein it closes its associated opening and an open position wherein it extends outwardly from said body, and means for swinging said vanes about their pivots, each vane on one side of said body being associated with a vane on the other side of said body in such a manner that, when in open position, they will be co-planar and inclined with respect to the said walls, and the several pairs of opposed co-planar vanes will be parallel to one another, and said vanes when in closed position forming portions of the continuous smooth contour of said body, whereby when said body intercepts the rotor slipstream, and the vanes being in open position, the slipstream will be guided by said vanes through said openings and through said body, and the path of the slipstream deflected, so as to impose a force on said body.

GEORGE FRANCIS MYERS.

REFERENCES CITED

The following references are of record in the file of this patent:

UNITED STATES PATENTS

| Number | Name | Date |
|---|---|---|
| 1,006,335 | Yarrington | Oct. 17, 1911 |
| 1,046,895 | Stubblefield | Dec. 10, 1912 |
| 1,230,881 | Taylor | June 26, 1917 |
| 1,510,317 | Gold | Sept. 30, 1924 |
| 1,520,292 | Kray | Dec. 23, 1924 |
| 1,743,378 | Newbauer | Jan. 14, 1930 |
| 1,747,334 | Sundstedt | Feb. 18, 1930 |
| 1,775,783 | Perrin | Sept. 16, 1930 |
| 1,784,027 | Pigott | Dec. 9, 1930 |
| 1,789,254 | Perrin | Jan. 13, 1931 |
| 1,822,179 | Thomas | Sept. 8, 1931 |
| 1,836,617 | Perrin | Dec. 15, 1931 |
| 1,903,440 | Cambridge | Apr. 11, 1933 |
| 2,094,105 | Myers | Sept. 28, 1937 |
| 2,111,804 | Page | Mar. 22, 1938 |

FOREIGN PATENTS

| Number | Country | Date |
|---|---|---|
| 241,243 | Great Britain | Oct. 19, 1925 |
| 255,936 | Great Britain | July 28, 1926 |
| 274,534 | Great Britain | July 18, 1927 |